(12) United States Patent
Bromberg et al.

(10) Patent No.: US 7,279,143 B2
(45) Date of Patent: *Oct. 9, 2007

(54) PLASMATRON-CATALYST SYSTEM

(75) Inventors: Leslie Bromberg, Sharon, MA (US); Daniel R. Cohn, Chestnut Hill, MA (US); Alexander Rabinovich, Swampscott, MA (US); Nikolai Alexeev, Moscow (RU)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/918,306

(22) Filed: Aug. 13, 2004

(65) Prior Publication Data

US 2005/0019230 A1    Jan. 27, 2005

Related U.S. Application Data

(63) Continuation of application No. 09/960,046, filed on Sep. 21, 2001, now Pat. No. 6,793,899, which is a continuation-in-part of application No. 09/182,537, filed on Oct. 29, 1998, now abandoned, which is a continuation-in-part of application No. 08/859,118, filed on Jan. 19, 1996, now Pat. No. 5,887,554.

(51) Int. Cl.
B01J 19/12 (2006.01)

(52) U.S. Cl. .................. 422/186.04; 422/186.08; 422/186.23; 422/186.21; 60/205; 60/275

(58) Field of Classification Search ............... 48/127.4, 48/DIG. 8; 429/17, 19; 422/186, 186.04, 422/186.08, 186.23, 186.21, 188, 189, 190, 422/194, 198, 211, 906; 60/205, 275
See application file for complete search history.

(56) References Cited

U.S. PATENT DOCUMENTS

| | | | |
|---|---|---|---|
| 3,755,131 A | 8/1973 | Shalit | 204/246 |
| 3,894,605 A | 7/1975 | Salvadorini | 180/65.4 |
| 4,033,133 A | 7/1977 | Houseman et al. | 60/606 |
| 4,099,489 A | 7/1978 | Bradley | 123/3 |
| 4,168,296 A | 9/1979 | Lundquist | 423/56 |
| 4,473,622 A | 9/1984 | Chludzinski et al. | 429/19 |
| 4,522,894 A | 6/1985 | Hwang et al. | 429/17 |
| 4,578,955 A | 4/1986 | Medina | 60/709 |
| 5,212,431 A | 5/1993 | Origuchi et al. | 318/139 |
| 5,228,529 A | 7/1993 | Rosner | 180/65.3 |
| 5,362,939 A | 11/1994 | Hanus et al. | 219/121.59 |
| 5,409,784 A * | 4/1995 | Bromberg et al. | 429/13 |
| 5,425,332 A * | 6/1995 | Rabinovich et al. | 123/3 |
| 5,437,250 A | 8/1995 | Rabinovich et al. | 123/3 |
| 5,445,841 A | 8/1995 | Arendt et al. | 426/312 |
| 5,451,740 A | 9/1995 | Hanus et al. | 219/121.59 |
| 5,567,398 A | 10/1996 | Ruhl et al. | 422/197 |
| 5,674,308 A | 10/1997 | Meissner et al. | 75/450 |
| 5,852,927 A * | 12/1998 | Cohn et al. | 60/780 |

(Continued)

*Primary Examiner*—N. Bhat
(74) *Attorney, Agent, or Firm*—Sam Pasternack; Choate Hall & Stewart LLP

(57) ABSTRACT

A plasmatron-catalyst system. The system generates hydrogen-rich gas and comprises a plasmatron and at least one catalyst for receiving an output from the plasmatron to produce hydrogen-rich gas. In a preferred embodiment, the plasmatron receives as an input air, fuel and water/steam for use in the reforming process. The system increases the hydrogen yield and decreases the amount of carbon monoxide.

17 Claims, 5 Drawing Sheets

U.S. PATENT DOCUMENTS 5,887,554 A    3/1999   Cohn et al. .................... 123/3
6,130,260 A    10/2000  Hall et al. ................... 518/703
6,245,303 B1 * 6/2001   Bentley et al. ............. 422/193

* cited by examiner

PLASMATRON-CATALYST SYSTEM

RELATED APPLICATIONS

This application is a continuation of U.S. application Ser. No. 09/960,046 filed Sep. 21, 2001, now U.S. Pat. No. 6,793,899, which is a continuation-in-part of U.S. application Ser. No. 09/182,537 filed Oct. 29, 1998, for "Plasmatron-Catalyst System," now abandoned, which is a continuation-in-part of U.S. application Ser. No. 08/589,118 filed Jan. 19, 1996, for "Rapid Response Plasma Fuel Converter Systems." now U.S. Pat. No. 5,887,554, the teachings of all of which are hereby incorporated by reference.

GOVERNMENT SUPPORT

This invention was made with government support under Contract Number DE-FG07-98ID13601 awarded by the U.S. Department of Energy. The government has certain rights in the invention.

FIELD OF THE INVENTION

This invention relates to a plasmatron-catalyst system which can maximize hydrogen yield and decrease the amount of carbon monoxide.

BACKGROUND OF THE INVENTION

The pending U.S. application mentioned above, of which this application is a continuation-in-part, discloses and claims the use of a rapid response plasmatron for converting hydrocarbon fuels into hydrogen-rich gases. This process may be carried on-board vehicles.

Converting hydrocarbon fuels into hydrogen-rich gas (reforming) can be achieved with a plasmatron reactor. There are many advantages of using a plasmatron in the reforming process. Advantages include fast response (less than one second), adequate conversion into hydrogen-rich fuel, compactness (high hydrogen productivity), robustness (stable process), and the ability of the plasmatron to use many fuels, including hard-to-reform gasoline, diesel and biofuels.

For internal combustion applications, the hydrogen purity is not of great importance. High conversion efficiency into hydrogen is not necessary, since the low weight hydrocarbons that accompany the hydrogen produced by the plasmatron are also good fuels for use in internal combustion engines. More important is to minimize the energy consumed in the plasmatron during the reforming process.

U.S. Pat. Nos. 5,425,332 and 5,437,250 disclose plasmatron-internal combustion engine systems and the teachings of these two patents are incorporated herein by reference. Plasmatrons of the type used in the present invention are described in detail in these two patents.

Partial oxidation is a preferred method of reforming. An advantage of partial oxidation is that it eliminates the need for storing additional liquids on-board vehicles. Also, a fraction of the fuel is reformed in order to allow the introduction into the cylinder of an engine hydrogen-rich gas to improve the combustion process. Since the intention of the prior art is not to reform all of the fuel, the issues of efficiency, although still relevant, have not heretofore driven the design of a plasmatron system.

The previous application discloses the use of plasma catalysts on-board vehicles. The process of converting the hydrocarbon into hydrogen rich gases by the use of plasma catalysts addresses mainly the energy requirement in the plasmatron in the reformation process. Plasma catalysts, as used for applications in internal combustion engines, can decrease the electrical energy requirement. The prior art does not suggest the use of catalysts to maximize hydrogen yield nor to decrease the amount of CO (carbon monoxide) that is produced in the partial oxidation process (The hydrogen yield is defined as the ratio of the hydrogen in the reformate to the amount of hydrogen content in the fuel).

The prior art does not extend plasma catalysts into the context of fuel cell vehicles and stationary fuel cells in which very high hydrogen yields and low energy consumption are required.

The requirements on a reformate for fuel cell applications are very different from those for use of hydrogen rich gas in internal combustion engines. As described above, for application to internal combustion engines, it is not necessary to have high yields, a very efficient process or very clean gas. As used herein, clean gas is defined to be gas with small concentrations of CO, since CO is a poison to some types of fuel cells that are presently being considered for both stationary and vehicular applications, of which the PEM fuel cell is the most advanced candidate. U.S. Pat. No. 5,409,784 discloses plasmatron/fuel cell combinations and the teachings of this patent are incorporated herein by reference.

The prior art also does not disclose the possible use of water/steam in the reforming process.

SUMMARY OF THE INVENTION

In one aspect, the plasmatron-catalyst system of the invention for generating hydrogen rich gas includes a plasmatron and at least one catalyst for receiving an output from the plasmatron to produce hydrogen rich gas. The catalyst is located at such a position downstream from the plasmatron as to be activated by the hydrogen and radicals produced by the plasmatron. In a preferred embodiment, the plasmatron receives as an input air, fuel and water/steam. The plasmatron may also receive exhaust gas from an engine or fuel cell. It is preferred that the at least one catalyst receive as an input air, fuel and water/steam. The catalyst may also receive exhaust gas from an engine or fuel cell.

In another embodiment, the at least one catalyst includes a heat exchanger in heat exchange relation with the catalyst to preheat the air, fuel and water/steam. One embodiment includes a plurality of catalyst sections wherein each catalyst section receives additional air, fuel or water/steam.

In another aspect, the plasmatron catalyst system further includes a fuel cell for receiving the hydrogen rich gas, the hydrogen rich gas having reduced CO content. The fuel cell may be in a vehicle or in a stationary setting.

In another embodiment, the plasmatron is followed by fuel injection system for a partial oxidation process, the fuel injection system followed by a catalyst for improved yields, the catalyst followed by water/steam injection and a water-shift reformer catalyst whereby hydrogen concentration is increased and CO concentration is decreased. In any of these embodiments, the catalyst may be a water-shifting catalyst. The catalyst may also be a partial oxidation catalyst or a steam reforming catalyst. In yet another embodiment, the catalysts are a combination of partial oxidation, steam reforming or water-shift catalyst with possible addition of water/steam in between adjacent catalytic regions.

In another embodiment, the steam reforming catalyst is followed by a water-shifting catalyst, with or without additional water/steam injection prior to the water-shifting catalyst.

The present system may be operated in a less efficient non-catalytic mode of operation during cold start followed thereafter by more efficient catalytic plasma reforming after the catalyst reaches operating temperature. The Water/steam may be obtained from oxidation of hydrogen in a fuel cell or by combustion in an engine such as a diesel engine. The water-steam may also be obtained from the exhaust of a diesel engine.

In yet another aspect, the hydrogen rich gas is delivered to a catalytic converter of an internal combustion engine wherein the enthalpy of the hydrogen-rich gas preheats and/or activates the catalyst in the catalytic converter. The hydrogen-rich gas produced by the system of the invention may also be used for reducing processes in metallurgy and chemistry. The hydrogen-rich gases may also be used for hydrogenation as in food processing and fuel upgrading.

In yet another embodiment, the CO content of the reformate is decreased by the use of a non-thermal, catalytic reaction to selectively oxidize the CO to $CO_2$.

DESCRIPTION OF THE PREFERRED EMBODIMENT

Figure 1:
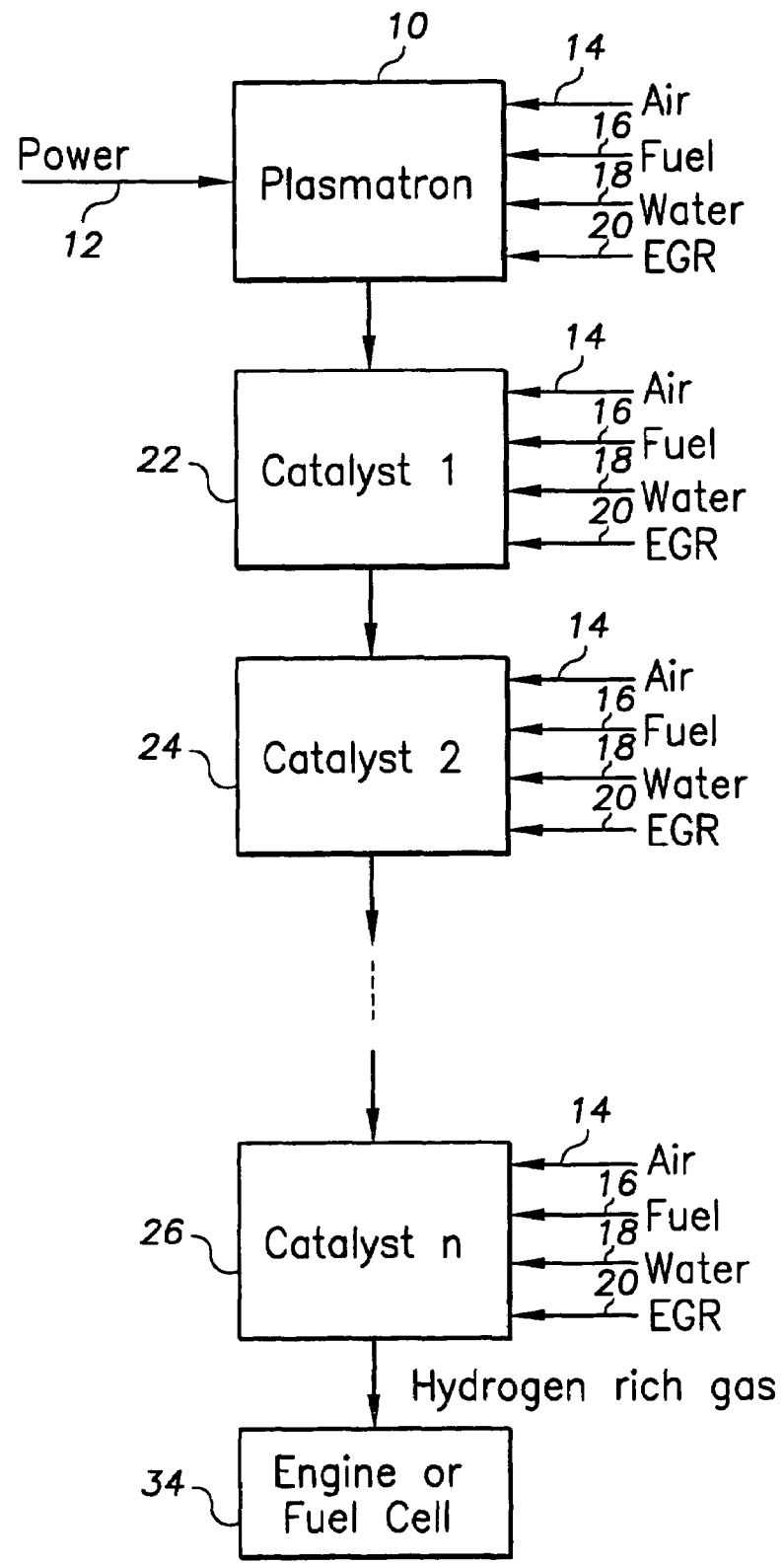
FIG. 1. is a block diagram of an embodiment of the invention illustrating multiple catalyst sections.

Water/steam can be used to achieve several objectives in the reforming process. These objectives include use in a water-shift reaction, downstream from the plasmatron and reactor, in order to reduce the CO concentration and increase the hydrogen concentration. Water/steam can also be used to perform steam reforming in which the water/steam reacts with the hydrocarbon fuel to produce hydrogen and CO. Water/steam can also be used in an autothermal reaction in which both air and water/steam are used in order to insure that the exothermicity of the partial oxidation process is balanced by the endothernicity of the steam reforming reaction. In this case, the reforming reaction is energy neutral. The use of water/steam, oxygen and fuel in a plasmatron reactor forms a continuum of possibilities. In the case of partial oxidation, the maximum hydrogen yield is 100%, while when water/steam is added the hydrogen yield can be larger than 100% by virtue of the release of hydrogen from the water/steam.

It will be appreciated by those skilled in the art that exhaust gases, either from a fuel cell or an internal combustion engine may be used as an input to the plasmatron for reforming. In this case, the reformed gas composition is nitrogen, CO, $CO_2$, and water.

It has been demonstrated experimentally by the inventors herein, that by using catalysts downstream from the plasmatron, the electrical energy consumption in the plasmatron is reduced substantially (by a factor of 9) with increased hydrogen yields (approaching 100%) and with relatively small CO concentrations (at the present time, about 1-2%, but possibly smaller in the future with improved reactor design).

The need to preheat the catalyst slows down the response of a system operating in plasma catalysis mode. Fast response is needed, especially for on-board applications, for the fast generation of hydrogen during initial operation of a vehicle after a prolonged shut down. In order to allow for rapid response, the mode of operation of the plasmatron is varied. During cold starts, the plasmatron operates with larger electrical input, resulting in gases with high enthalpy, that allows for high yields without the need of the catalyst, but at the expense of increased energy consumption. In other words, during cold start the system operates in a non-catalytic mode. Once the catalysts are warmed up, the plasmatron energy input is decreased to the steady state level allowed by the more efficient plasma catalyst.

The hydrogen rich gas from the plasmatron may also be introduced into the catalytic converter that is used to control emissions from an internal combustion engine. The hydrogen and radicals produced by the plasmatron interact with the catalyst, making it more active. In addition, combustion of the hydrogen rich gas on the catalytic surface increases the temperature of the catalyst, and can be used for quick turn-on of catalyst during cold start-up. The long-lived radicals produced by the plasmatron also enhance the catalytic performance of the converter.

The hydrogen productivity in plasma-catalytic mode, with water/steam injection, can be very high, generating about 10 cubic meters of hydrogen per liter of reactor.

There is a synergism between a plasmatron and a catalyst downstream from the plasmatron. Radicals produced in the plasma can travel to the location of the catalyst and activate the catalysis. In this manner, very active catalysts can be generated. The very active catalyst can be used as a means to: (1) increase the throughput through the catalyst (for constant volume catalyst, increased throughput and increased space velocity through the catalyst); (2) decrease the amount of catalyst required, for a given flow rate; and (3) accomplish more than one function of the catalyst, such as a combination of partial oxidation, steam reforming or water shifting, all within the same catalyst, as space velocities that are greater than would be the case if there were no radical activation of the catalyst.

The catalyst needs to be close to the plasma, due to the finite lifetime of the relevant radicals and activated species. Their lifetimes are on the order of 10 microseconds to 1 millisecond. For velocities of 10-100 m/s, the catalyst needs to be located within 1 cm to 10 cm downstream from the plasma source in order to effectively use the radicals that are generated.

With reference now to FIG. 1, a plasmatron 10 is supplied with electrical power 12. It is contemplated that this plasmatron will also receive as input air 14, fuel 16, water 18 and optionally exhaust gas 20. In this embodiment, the output of the plasmatron 10 passes into a first catalyst section 22 and from there into a second catalyst section 24. Any number of additional catalyst sections may be added up to catalyst n illustrated at 26 in FIG. 1. The catalyst used in the catalyst sections may be a water-shifting catalyst, a partial oxidation catalyst or a steam reforming catalyst. The inputs of air 14, fuel 16, and water 18 can be introduced in controlled amounts, including just water/steam. The catalyst or catalysts are located in a position downstream from the plasmatron so as to be activated by hydrogen and radicals produced by the plasmatron.

Figure 2:
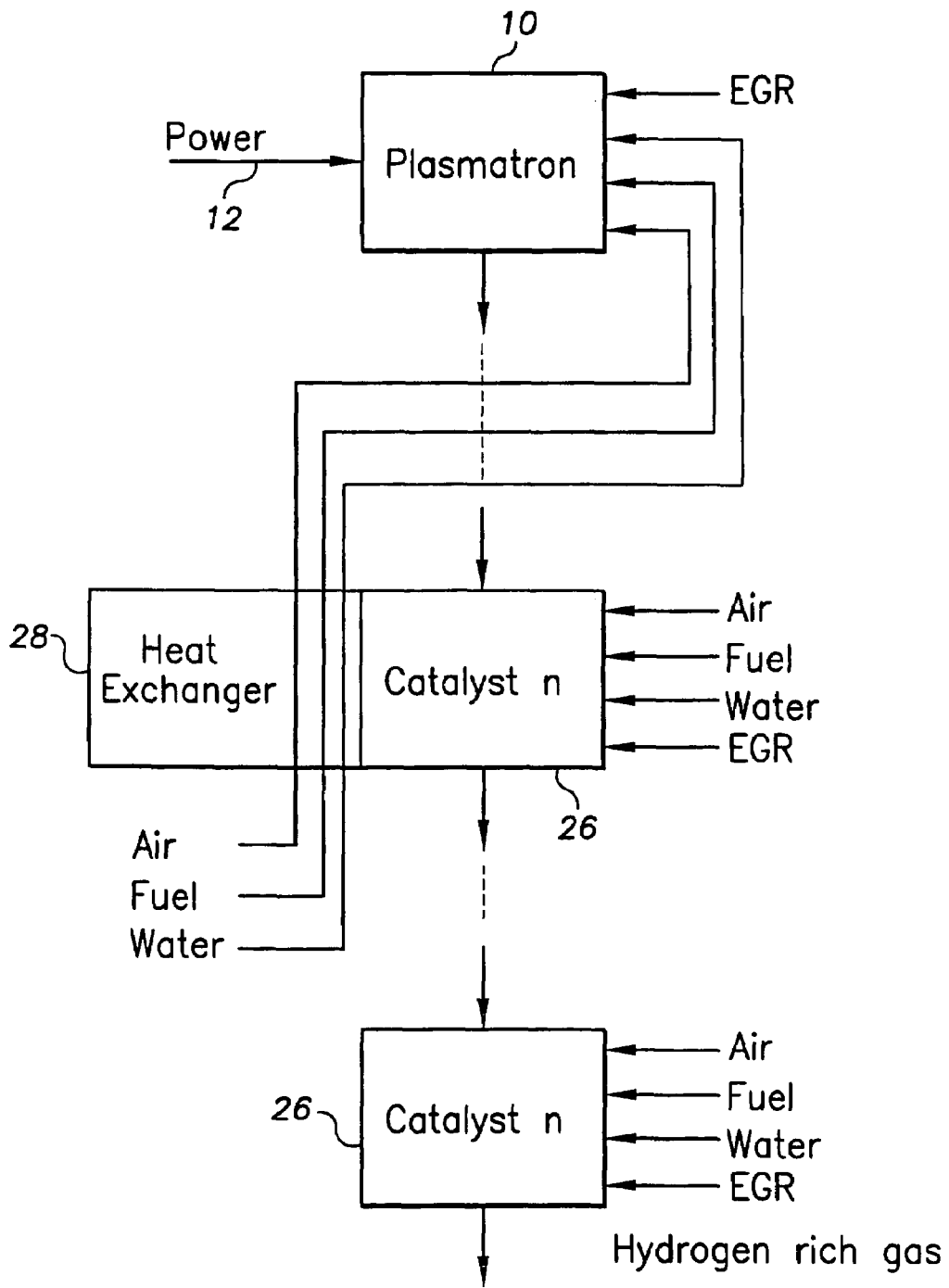
FIG. 2. is a block diagram of an embodiment of the invention including a heat exchanger.
Figure 3:
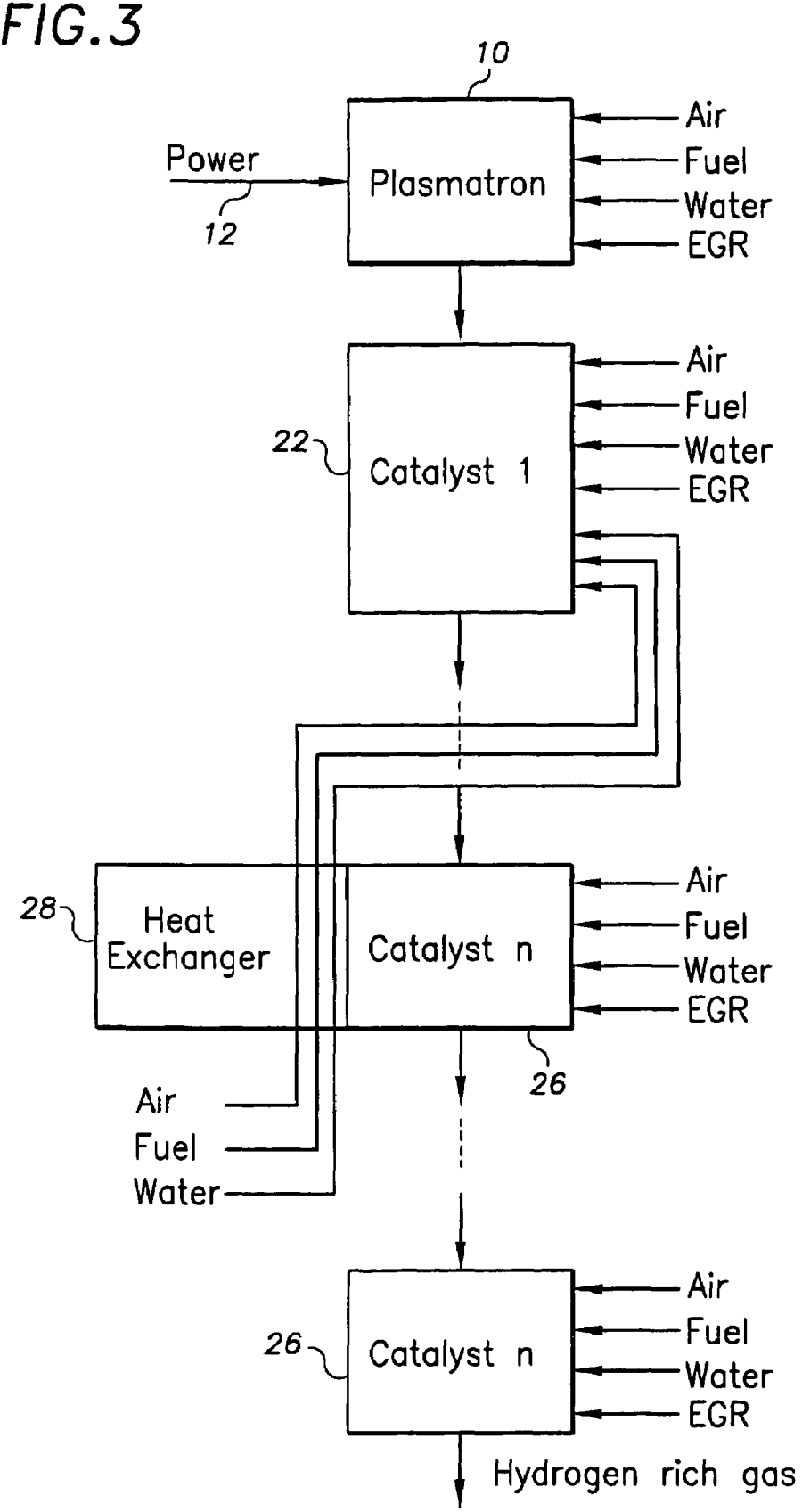
FIG. 3. is a block diagram of yet another embodiment of the invention.

With reference to FIG. 2, a heat exchanger 28 is provided in heat exchange relation with a catalyst n (identified as 26). The heat exchanger 28 will preheat the air, fuel and water before it enters the plasmatron 10. Any number of additional catalysts may then follow. A similar arrangement is shown in FIG. 3 in which the heat exchanger 28 serves to preheat fuel, air and water before it enters the first catalyst 22.

Figure 4:
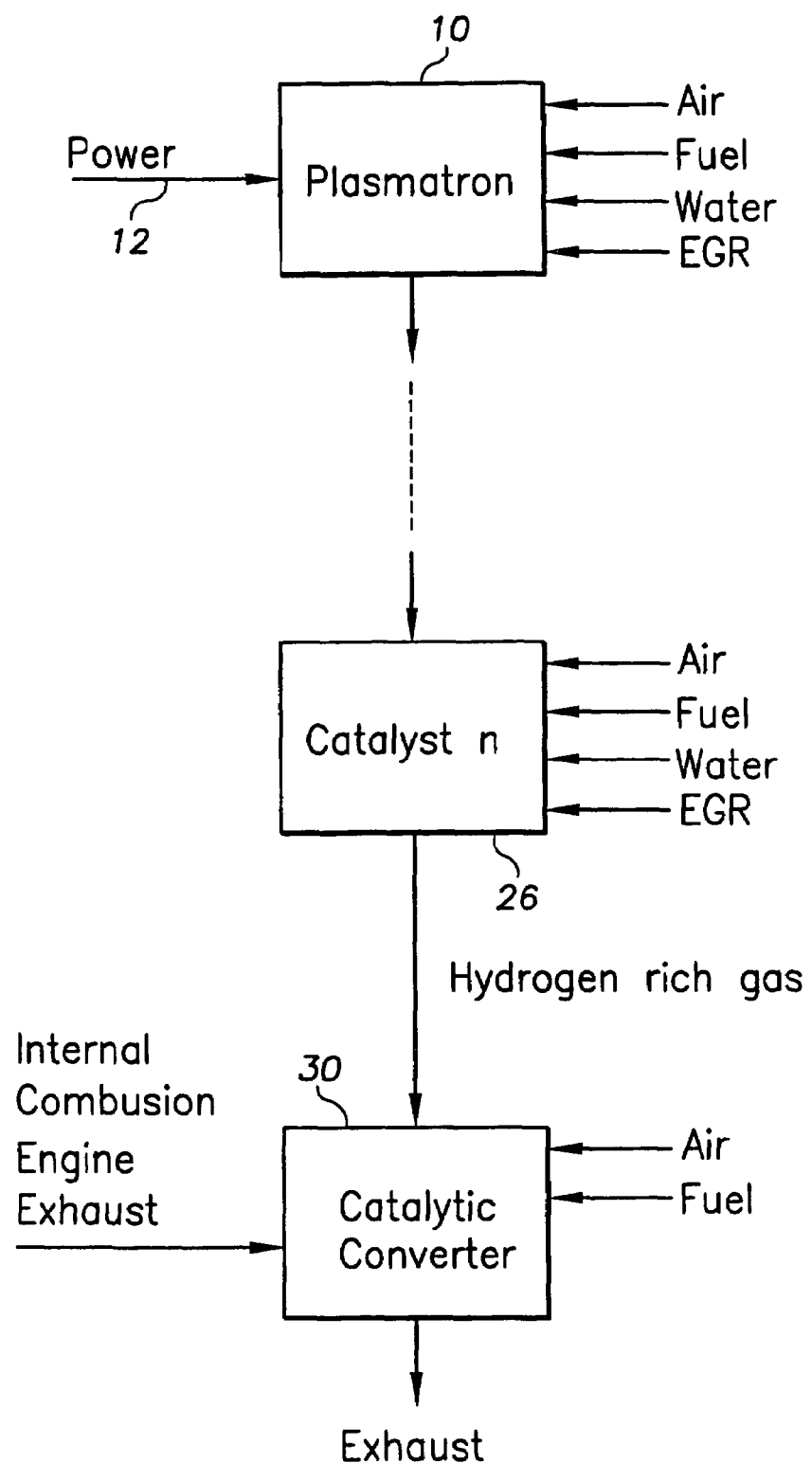
FIG. 4. is a block diagram of an embodiment of the invention including a catalytic converter.

A very important aspect of the present invention is illustrated in FIG. 4. In this embodiment, the output of the plasma and the multiple catalyst stages is directed to a catalytic converter 30 such as conventionally used with internal combustion engines. In this case, the hydrogen-rich gas and radicals produced by the plasmatron interact with the catalyst making it more active. In addition, air and fuel may be injected into the catalytic converter 30 so that combustion of the hydrogen-rich gas on the catalytic surface increases the temperature of the catalyst and can be used for quick turn-on of the catalyst during cold start up. Additionally, one or more catalysts may also be positioned within or as part of the catalytic converter 30.

Figure 5:
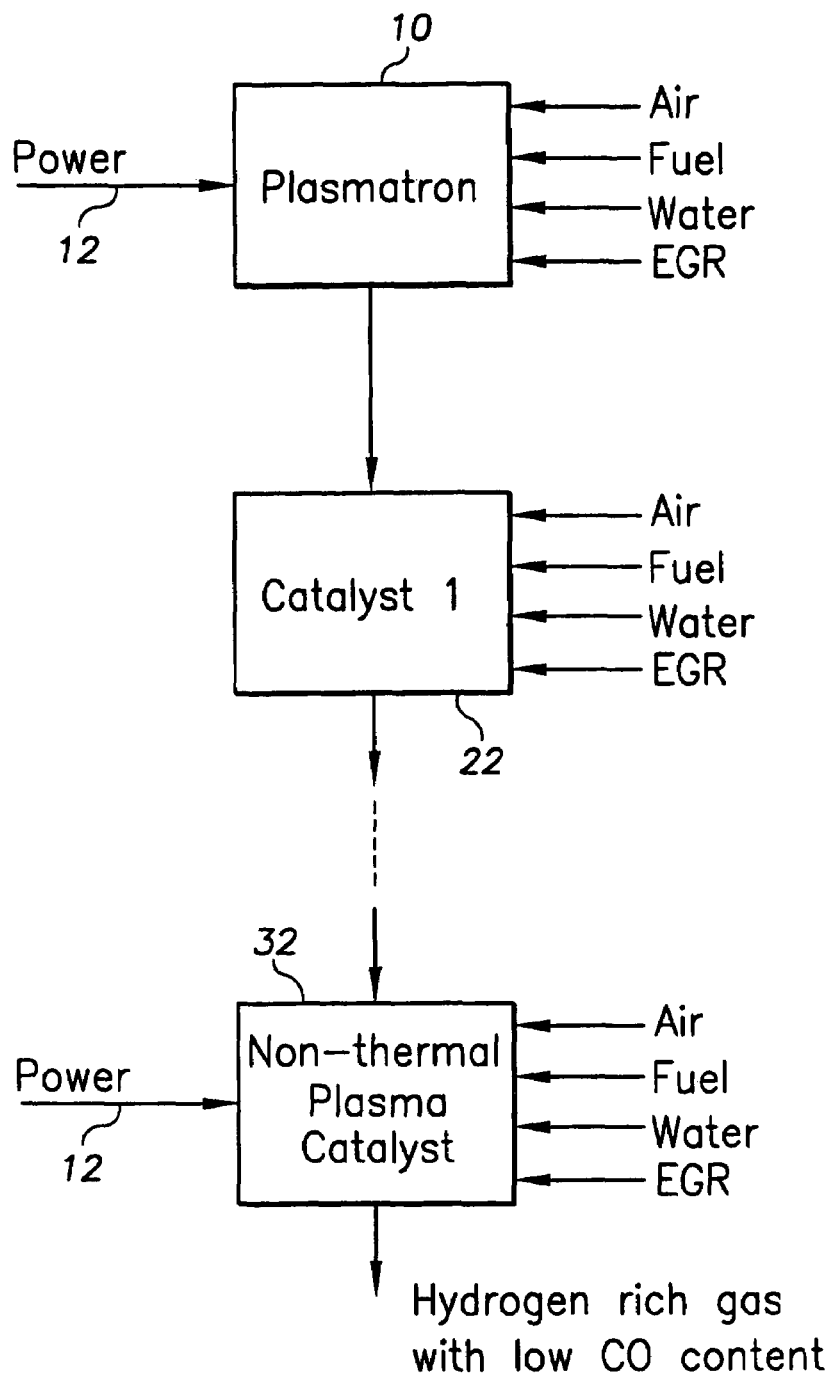
FIG. 5. is a block diagram of an embodiment of the invention including a non-thermal plasma catalyst.

Finally, with reference to FIG. 5, the output of the plasmatron-catalyst system is introduced into a non-thermal plasma catalyst of 32 which produces a hydrogen-rich gas with a low CO content.

With reference again to FIG. 1, those skilled in the art will recognize that hydrogen rich gas from the last catalyst stage may be delivered to an engine or fuel cell 34.

It is thus seen that the present invention results in a rapid response plasmatron/catalyst system which can maximize the hydrogen yield and decrease the amount of carbon monoxide by using water/steam in the reforming process.

It is recognized that modifications and variations of the present invention will occur to those skilled in the art and it is intended that all such modifications and variations be included within the scope of the pended claims.

What is claimed is:

1. A plasmatron-catalyst apparatus for generating hydrogen-rich gas, comprising:
   a plasmatron; and
   at least one catalyst that receives an output from the plasmatron and produces hydrogen-rich gas, wherein a hydrogen yield is at least approximately 100%.

2. A vehicle, comprising:
   a plasmatron;
   at least one catalyst that receives an output from the plasmatron and produces hydrogen-rich gas; and
   an engine that receives hydrogen-rich gas output from said at least one catalyst.

3. The vehicle of claim 2, wherein the plasmatron includes means for receiving as an input air, fuel and water/steam.

4. The vehicle of claim 2, wherein the plasmatron includes means for receiving exhaust gas from the engine.

5. The vehicle of claim 2, wherein the at least one catalyst includes means for receiving as an input air, fuel and water/steam.

6. The vehicle of claim 2, wherein the at least one catalyst includes means for receiving exhaust gas from the engine.

7. The vehicle of claim 2, wherein the at least one catalyst includes a heat exchanger in heat exchange relation with the catalyst to preheat air, fuel and water/steam.

8. The vehicle of claim 2, wherein said at least one catalyst includes a plurality of catalyst sections, and wherein each catalyst section receives air/fuel or water/steam.

9. The vehicle of claim 2, wherein said at least one catalyst includes at least one of a water-shifting catalyst, a partial oxidation catalyst and a steam reforming catalyst.

10. A vehicle, comprising:
    a plasmatron;
    at least one catalyst that receives an output from the plasmatron and produces hydrogen-rich gas; and
    at least one fuel cell that receives hydrogen-rich gas output from said at least one catalyst.

11. The vehicle of claim 10, wherein the plasmatron includes means for receiving as an input air, fuel and water/steam.

12. The vehicle of claim 10, wherein the plasmatron includes means for receiving exhaust gas from the fuel cell.

13. The vehicle of claim 10, wherein the at least one catalyst includes means for receiving as an input air, fuel and water/steam.

14. The vehicle of claim 10, wherein the at least one catalyst includes means for receiving exhaust gas from the fuel cell.

15. The vehicle of claim 10, wherein the at least one catalyst includes a heat exchanger in heat exchange relation with the catalyst to preheat air, fuel and water/steam.

16. The vehicle of claim 10, wherein said at least one catalyst includes a plurality of catalyst sections, and wherein each catalyst section receives air/fuel or water/steam.

17. The vehicle of claim 10, wherein said at least one catalyst includes at least one of a water-shifting catalyst, a partial oxidation catalyst and a steam reforming catalyst.

* * * * *